Nov. 27, 1945.   C. GERST   2,389,847
POWER TAKE-OFF
Filed May 29, 1944   3 Sheets-Sheet 1
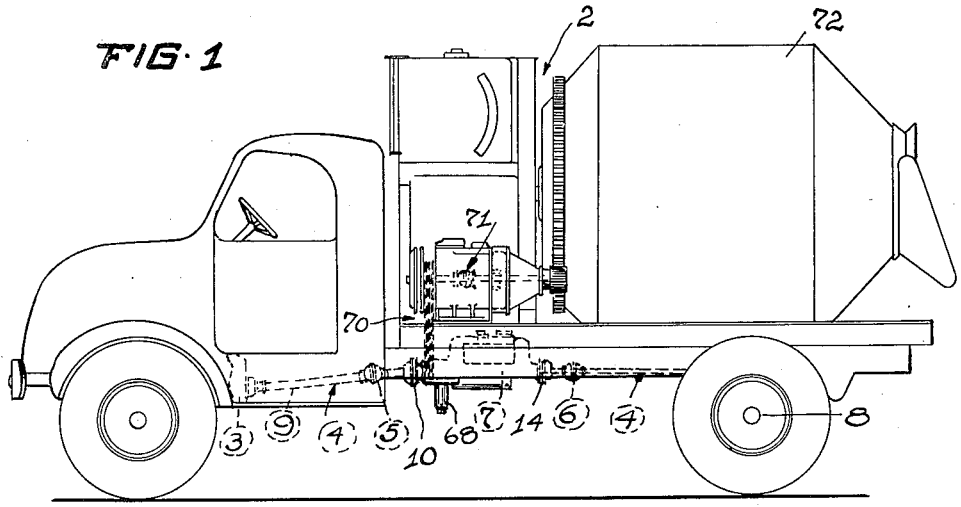
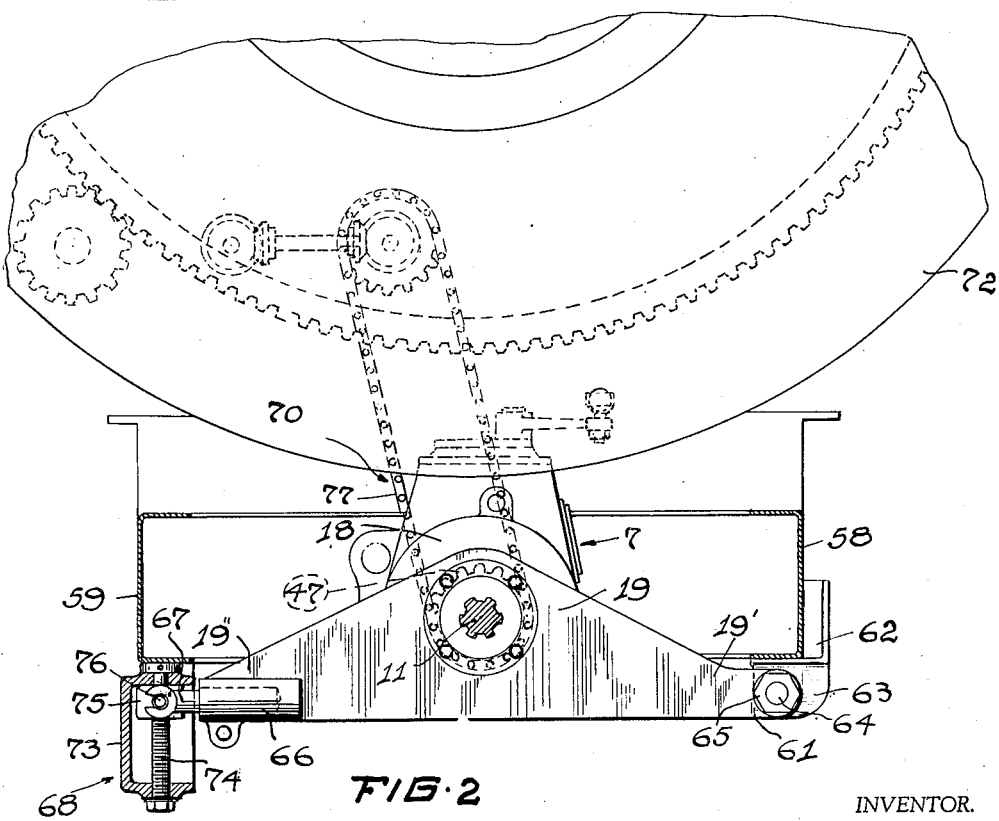
INVENTOR.
CHRIS GERST
BY
Gustav A. Wolff
ATT.

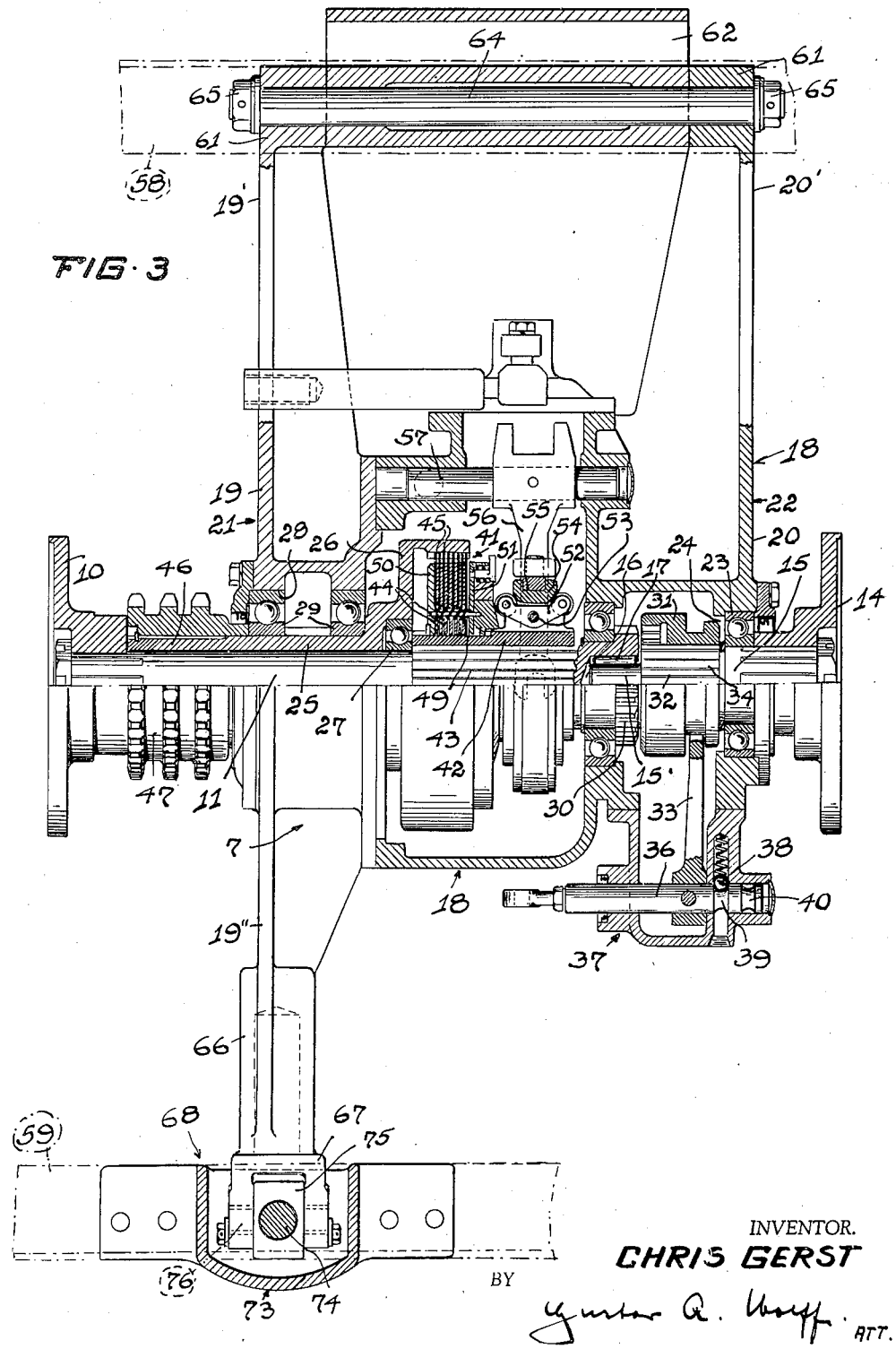

Nov. 27, 1945.   C. GERST   2,389,847
POWER TAKE-OFF
Filed May 29, 1944   3 Sheets-Sheet 3
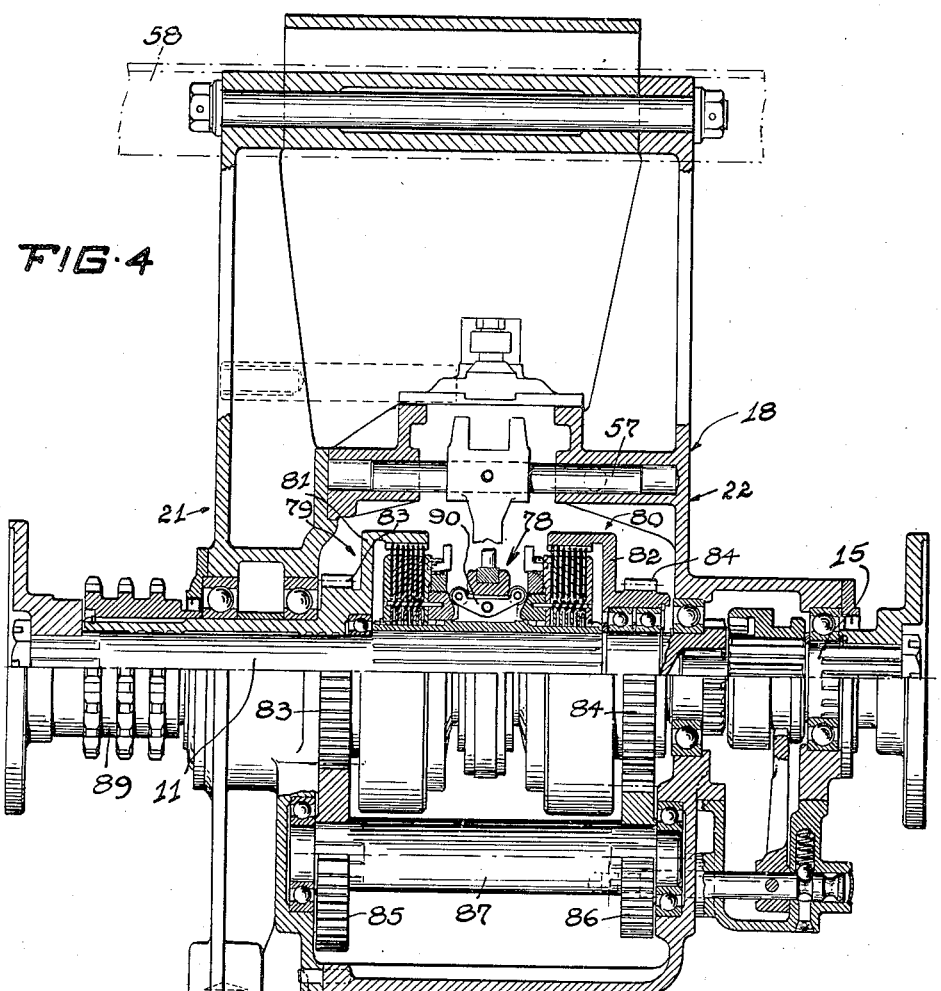
INVENTOR.
CHRIS GERST Patented Nov. 27, 1945

2,389,847

UNITED STATES PATENT OFFICE 2,389,847

POWER TAKE-OFF

Chris Gerst, Dearborn, Mich.

Application May 29, 1944, Serial No. 537,873

5 Claims. (Cl. 180—53)

My invention relates in general to a power take-off and, more particularly, to a power take-off for self-propelled vehicles in which the engine of the vehicle furnishes the power to drive other devices, as, for example, the mixing drum of a truck mixer. This type of power take-off generally embodies a split shaft coupled with the forward and rear sections of the split drive shaft of a vehicle, and a driven shaft coupled by means of a chain drive with the device to be driven, all as described in Patent No. 2,316,130 dated April 6, 1943, of which I am a co-inventor. In this patent the chain drive of the power take-off arrangement is tensioned by tilting the pivotally mounted casing of the power take-off pivotally supported on the sections of its split shaft. However, such a pivotal mounting of the casing of a power take-off is expensive in time, labor and material and prevents proper distribution of the weight of the power take-off. Thus, special supporting plates arranged crosswise of the vehicle frame must be installed and these plates must be properly aligned to effect proper pivotal mounting and rigid support of the casing in any position. Furthermore, due to the fact that the driven shaft of the power take-off is axially offset with respect to its pivot axis, proper weight distribution with respect to its pivot axis and the axis of the vehicle drive shaft is hardly possible.

The general object of this invention is the provision of a simplified power take-off in which the driven shaft is aligned with the split shaft and the vehicle drive shaft to permit proper distribution of the weight of the power take-off with respect to the axis of the vehicle mounting same.

Another object of the invention is the provision of a simplified power take-off of the type described which is adjustably mounted on the vehicle frame for tensioning the chain drive connecting the driven shaft with the device to be driven, and has the sections of its split shaft universally coupled with the sections of the split vehicle drive shaft for tensioning the chain drive without effecting the drive connection between the split shaft sections of the power take-off and the sections of the split drive shaft of the vehicle.

A further object of the invention is the provision of a power take-off of the type described above which is compact and sturdy in construction, can readily and easily be mounted on a truck or vehicle frame in substantial symmetrical alignment to the longitudinal axis thereof, and permits driving of either the vehicle or an auxiliary equipment, such as a concrete mixer, air compressor, etc., or both, the vehicle and the auxiliary equipment.

In addition, the invention has certain other marked superiorities which radically distinguish it from presently known structures. These improvements or superiorities embodying certain novel features of construction are clearly set forth in the following specification and the appended claims; and several preferred forms of embodiment of the invention are hereinafter shown with reference to the accompanying drawings forming part of the specification.

In the drawings:

Fig. 1 is a side view of a truck mixer with a power take-off according to the invention mounted thereon.

Fig. 2 is an enlarged fragmentary rear view, partly in section, of the truck mixer disclosed in Fig. 1, the view disclosing the symmetrical arrangement of the power take-off with respect to the longitudinal axis of the frame and the chain drive connection between the driven shaft and the transmission effecting rotation of the mixer drum.

Fig. 3 is a horizontal sectional view through a power take-off constructed in accordance with the invention.

Fig. 4 is a sectional view similar to Fig. 3 through a somewhat modified form of power take-off constructed in accordance with the invention; and Fig. 5 is a diagrammatic view indicating the gearing of the structure shown in Fig. 4.

Referring now in detail to the drawings, particularly Figs. 1 and 2, reference numeral 2 denotes a truck mixer, the main transmission 3 of which is coupled by means of a split drive shaft 4, having universal joints 5 and 6, with a power take-off unit 7 and rear axle 8 of the truck mixer. Thus, forward section 9 of split drive shaft 4 is coupled by a suitable coupling 10 with a shaft section 11 of unit 7 and rear section 12 of said split drive shaft is coupled by a coupling 14 with a shaft section 15 of said unit.

The shaft sections 11 and 15 of unit 7 are axially aligned and have their inner ends arranged adjacent to each other so that shaft section 15 extends with its inner reduced end 15' into a bore 16 of shaft section 11 and is freely rotatably supported therein by a roller bearing 17. Shaft sections 11 and 15 are rotatably mounted in a housing 18 and extend outwardly therefrom through its opposed walls 19 and 20. Thus, housing 18 which embodies front and rear portions 21 and 22 rotatably mounts in its front portion the shaft section 11 in a manner hereinafter to be described and in its rear portion the shaft section 15 in a ball bearing 23 disposed in an opening 24 of rear wall 20. Shaft section 11 is extended through the hub 25 of a clutch drum 26 and rotatably secured therein by a ball bearing 27. This hub extends through an opening 28 in front wall 19, which opening is aligned with opening 24 in rear wall 20 and is rotatably mounted in said front wall in ball bearings 29 disposed in opening 28.

The inner end of shaft section 11 includes an integral straight gear 30 cooperating with an internal straight gear 31 slidably mounted on the splined portion 32 of shaft section 15. The gear 31 is axially shifted into and out of engagement with straight gear 30 by a yoke member 33 extended into an annular groove 34 in the hub of internal gear 31, which yoke member has its outer end secured to a shifting rod 36 reciprocably mounted in a bearing portion 37 formed on housing 16. Preferably, as shown, rod 36 is held in position by a spring-pressed ball 38 which cooperates with circular recesses 39, 40 in said shifting rod and secures yoke member 33 and therewith gear 31 in engaged or disengaged position and thus prevent undesired changes in the coupled or uncoupled relation of shaft sections 11 and 15.

These shaft sections which, as stated above, are coupled with the forward and rear sections of split shaft 4, are coupled with each other by the described gear tooth type clutch which thus controls driving of the truck mixer. The power take-off of unit 7 is controlled by a friction clutch 41. This clutch, which is of the multiplate friction type, includes a splined hub 42 secured to the splined portion 43 of shaft section 11 and mounts on its hub 42 a plurality of friction driving disks 44 for axial non-rotatable movement with respect thereto. Disks 44 cooperate with alternately disposed friction disks 45, the outer portions of which are axially shiftably secured to the clutch drum 26. This drum has its hub 25 extended outwardly of housing 18 and mounts on the extended hub portion 46 a sprocket wheel or chain gear 47 keyed to portion 46. Disks 44 and 45, which are normally kept in spaced relation by a pin and spring structure 49, are forced into frictional engagement by a pair of clamping members formed by a backing plate 50 and a pressure plate unit 51 when unit 51 is shifted axially by means of a plurality of symmetrically arranged clutch finger assemblies 52. These assemblies are pivoted as at 53 to hub 42 and actuated upon by a grooved, axially shiftably supported ring member 54, the groove 55 of which is engaged by a yoke member 56 in turn supported on a slidable mounted shaft 57. Actuation of shaft 57 in one direction effects frictional engagement of disks 44 and 45 and therewith rotation of clutch drum 26 and chain gear 47, and actuation of shaft 57 in an opposite direction permits release of the frictional engagement by pin and spring structure 49.

The thus described power take-off unit is hinged to the side rail 58 of the frame of the truck mixer. For such a purpose, housing 18 of unit 7 has its side walls 19 and 20 extended as at 19', 20' and shaped with perforated ear portions 61. These ear portions cooperate with a bracket member 62 which is secured to side rail 58. This bracket member mounts in its perforated end portion 63 a bolt 64, and this bolt is extended through the ear portions 61 and secured against axial shifting by nut members 65. In addition, housing 18 has its side wall 19 extended in an opposite direction as at 19" and mounts in a bearing housing 66 a yoke member 67 which cooperates with an adjusting device 68 attached to side rail 59. This adjusting device permits vertical shifting of housing 18 and therewith tensioning of a chain drive connection 70 which couples the sprocket wheel 47 with a transmission 71 controlling rotation of mixing drum 72. This adjusting device consists of a housing 73 having rotatably mounted therein a vertically disposed screw member 74 and including a collar member 75 threadedly engaged with screw member 74. This collar member is formed with trunnions 76 which are engaged by the yoke member, so that rotation of screw member 74 swings housing 18 on the hinge formed by bolt 64 and effects tensioning of chain 77 of chain drive connection 70.

The thus described power take-off unit which can readily and easily be attached to a truck frame structure in such a manner that the weight of the unit is properly distributed with respect to the axis of the truck, permits individual or joint operation of the truck and mixing drum, or any other device to be driven, by singly or jointly actuating the two clutches, the gear type clutch and the friction type clutch, and, in addition, permits quick and efficient adjustment of the tension of the chain drive connection between the power take-off and the device to be driven.

In the power take-off unit described above sprocket wheel 47 can be rotated in one direction only. However, in some cases it might be desirable to provide for rotation of the sprocket wheel in opposite directions. Such a structure is shown in Figs. 4 and 5, in which the power take-off unit is similar in construction to the device shown in Fig. 3, with the exception that the friction type clutch consists of a dual type clutch structure 78 embodying two identically constructed multiplate friction clutches 79 and 80. These friction clutches have their respective clutch drums 81, 82 shaped to form straight gears 83, 84, respectively, which are coupled with each other over gears 85, 86 on a counter shaft 87 and an idler gear 88, so that clutch drums 81, 82 and therewith the sprocket wheel 89, will be rotated in one or the opposite direction depending upon which of the clutches 79 or 80 is actuated by operation of clutch finger assemblies 90.

Having thus described my invention what I claim is:

1. In a self-propelled vehicle a frame, an engine, a rear axle, a split drive shaft having a drive section universally coupled with said engine and a driven section universally coupled with said rear axle, a driven unit mounted on said vehicle, a power take-off device, and a chain drive coupling said device with said unit, said power take-off device being supported by said frame between the sections of said split drive shaft and including a housing substantially vertically adjustably secured to said frame, aligned shaft sections journaled in said housing and coupled with said drive shaft sections, means selectively coupling said aligned shaft sections with each other, a tubular power take-off shaft rotatably mounted on one of said aligned shaft sections, and means on said one shaft section and said power take-off shaft selectively frictionally coupling said power take-off shaft with said one shaft section, said housing being vertically shiftably secured to said frame and said power take-off shaft and shaft sections being aligned with each other to permit adjustment of the chain of said chain drive without substantial change in the alignment and weight distribution of said power take-off device with respect to the axis of said frame.

2. A self-propelled vehicle as described in claim 1, wherein said frame embodies opposed side rails, wherein said housing includes opposed walls rectangularly related to said side rails, which walls have the aligned shaft sections journaled therein, wherein said walls include extensions forming supporting means for said housing and dimensioned to adjustably support said housing in substantially symmetrical arrangement with respect to the axis of said frame, and wherein said supporting means at one side of said housing are hinged to one side rail and at the other side of said housing vertically adjustably secured to the other side rail of said frame.

3. In a self-propelled vehicle a frame, an engine, a rear axle, a split drive shaft having a drive section universally coupled with said engine and a driven section universally coupled with said rear axle, a driven unit mounted on said vehicle, a power take-off device and a chain drive coupling said device with said unit, said power take-off device being supported by said frame between the sections of said split drive shaft and including a housing substantially vertically adjustably secured to said frame, aligned shaft sections journaled in said housing and coupled with said drive shaft sections, means for selectively coupling said aligned shaft sections with each other, a tubular power take-off shaft rotatably mounted on one of said aligned shaft sections, reversible friction type coupling means with a dual friction type clutch structure on said one shaft section and said power take-off shaft, and gearing for selectively driving said power take-off shaft in opposite directions, said power take-off being coupled with said chain drive, said housing being shiftably secured to said frame, and said power take-off shaft and shaft sections being aligned with each other to permit adjustment of the chain of said chain drive without substantial change in the alignment and weight distribution of the power take-off device with respect to the axis of the frame.

4. In a self-propelled vehicle a frame including opposed side rails, an engine, a rear axle, a split drive shaft having forward and rear sections coupled with said engine and said rear axle, a driven unit mounted on said vehicle, a power take-off mounted on said frame and coupled with said forward and rear sections of said split drive shaft, and a chain drive coupling said driven unit with said power take-off, said power take-off including a housing, rotary driven means journaled in said housing and coupled with said chain drive, and a rotary driving means journaled in said driven means and coupled with the forward section of said split drive shaft, and said housing including oppositely extended attachment means rectangularly related to said rotary driven means, said attachment means securing said housing to said frame in substantial axial alignment with respect thereto, one of said attachment means being hinged to one of the side rails and the other of said attachment means being vertically adjustably secured to the other one of said side rails to permit tensioning of said chain drive without substantially changing the alignment and weight distribution of said power take-off.

5. In a self-propelled vehicle a frame including opposed side rails, an engine, a rear axle, a split drive shaft embodying a forward section coupled with said engine and a rear section coupled with said rear axle, a driven unit mounted on said vehicle, a power take-off device, and a chain drive coupling said power take-off device with said driven unit, said power take-off device embodying a housing, aligned shaft sections coupled with each other and said forward and rear sections of the split drive shaft, and a tubular power take-off shaft aligned with said aligned shaft sections and journaled in one wall of said housing, said tubular power take-off shaft rotatably mounting one of said aligned shaft sections and being individually frictionally coupled therewith, and said housing including oppositely extended attachment means rectangularly related to said power take-off shaft, one of said attachment means of said housing being hinged to one of said side rails and the other of said attachment means being vertically adjustably secured to the other one of said side rails to permit tensioning of said chain drive without substantially changing the alignment and weight distribution of said power take-off.

CHRIS GERST.